United States Patent [19]

Röhm

[11] 4,078,814
[45] Mar. 14, 1978

[54] POWER-ACTUATED CHUCK WITH MEANS FOR COUNTER-ACTING CENTRIFUGAL FORCE ON THE CHUCK JAWS

[76] Inventor: Günter Horst Röhm, Heinrich-Rohm-Str. 50, 7927 Sontheim, Germany

[21] Appl. No.: 776,250

[22] Filed: Mar. 10, 1977

[30] Foreign Application Priority Data

Mar. 16, 1976  Germany .............................. 2610906

[51] Int. Cl.² ............................................ B23B 31/14
[52] U.S. Cl. ...................................... 279/1 C; 279/121
[58] Field of Search ........................ 279/1 C, 1 F, 121

[56] References Cited

U.S. PATENT DOCUMENTS

| | | | |
|---|---|---|---|
| 2,828,134 | 3/1958 | Buck | 279/1 C |
| 2,893,744 | 7/1959 | Anthony | 279/121 X |
| 2,948,540 | 8/1960 | Garberding | 279/121 X |
| 2,982,558 | 5/1961 | Multer | 279/1 C |
| 3,814,451 | 6/1974 | Rohm | 279/121 |
| 3,984,114 | 10/1976 | Ovanin | 279/1 C |

FOREIGN PATENT DOCUMENTS 2,132,130  1/1973  Germany .......................... 279/1 C

*Primary Examiner*—Harold D. Whitehead
*Attorney, Agent, or Firm*—Karl F. Ross

[57] ABSTRACT

A power-actuated chuck has a chuck body provided with a plurality of chuck jaws which can be displaced radially to engage a workpiece. Centrifugal force tending to urge the jaws outwardly is counteracted by respective centrifugal weights at the ends of levers pivotally mounted upon a flange which is affixed to the back of the chuck body. Each weight has a nose which cams a respective pin axially on the body to directly or indirectly apply a radial force to the respective jaw, thereby biasing the same inwardly in accordance with the centrifugal force developed upon rotation of the chuck.

9 Claims, 3 Drawing Figures

POWER-ACTUATED CHUCK WITH MEANS FOR COUNTER-ACTING CENTRIFUGAL FORCE ON THE CHUCK JAWS

CROSS-REFERENCE TO RELATED APPLICATION

This application is related to my copending application Ser. No. 704,046 filed July 9, 1976 (see also U.S. Pat. No. 3,926,446).

FIELD OF THE INVENTION

The present invention relates to power-actuated chucks and, more particularly, to power-actuated multi-jaw chucks provided with means for counteracting the centrifugal force normally tending to bias the chuck jaws outwardly.

BACKGROUND OF THE INVENTION

In power-actuated chucks, a rotationally symmetrical chuck body is mounted upon the head stock spindle of a machine tool and generally carries a plurality of (e.g. three or four) chuck jaws which are radially displaceable in respective guides inwardly and outwardly, respectively, to engage a workpiece or to disengage therefrom.

It has previously been recognized that rotation of the chuck body at high speeds tends to generate a centrifugal force at each jaw which urges the same outwardly and may relax the force with which the jaw engages the workpiece. For this reason chucks have been provided heretofore with counterweights on respective levers adapted to bear upon the jaw and thus apply a force which resists the centrifugal force on the jaws themselves.

Such a chuck has been described in German Open Application DT-OS No. 2,132,130. In this chuck, the centrifugal weights are received in recesses formed directly in the chuck body and on which the levers are swingable. Since each chuck jaw is generally provided with a respective centrifugal weight and lever, the levers are formed of the double-arm type with the weight being mounted upon the long lever arm and the short lever arm bearing directly against the chuck jaw. Such systems have several disadvantages.

The chuck body is subjected to excessive forces because, in addition to the centrifugal forces which are normally applied and which act upon the chuck jaws, the centrifugal forces applied to the weights eventually must be absorbed by the chuck body as well. Since the chuck body is provided with numerous additional recesses to accommodate the levers, counterweights and the like, these additional stresses have been found to create deformations which are highly undesirable, cause material fatigue and generally act to weaken the chuck and reduce the effectivity thereof.

In fact, when such chucks are operated at high speeds, structural failure of the chuck body poses a serious danger. The chuck body tends to lose its stiffness and tends to deteriorate.

These effects are all the more noticeable as the diameter of the chuck and the speed at which it is operated increase.

OBJECTS OF THE INVENTION

It is the principal object of the present invention to provide an improved power-actuated chuck in which the aforedescribed disadvantages are obviated.

Another object of this invention is to provide a multi-jaw chuck with improved means for counteracting the centrifugal force on the jaws of the chuck body without detrimentally affecting the strength and the structural characteristics of the chuck body.

It is another object of the invention to provide improved means for applying a counterforce to the jaws of a multi-jaw chuck without weakening the chuck body or inducing material fatigue therein.

Still another object of the invention is to provide a power-actuated chuck which can be made with large dimensions and operated at extremely high speeds without disadvantage.

SUMMARY OF THE INVENTION

These objects and others which will become apparent hereinafter are attained, in accordance with the present invention, in a chuck of the aforedescribed type which can be constituted, e.g. in accordance with the above-mentioned copending application, with a chuck body, a plurality of jaws radially shiftable on the chuck body, and means for actuating these jaws. According to the invention, the means for counteracting the centrifugal force upon the jaws includes respective levers journaled in a flange which is affixed to the rear face of a chuck body, each of these levers carrying a centrifugal weight which is swung outwardly upon rotation of the chuck body and acts upon the respective jaw.

According to a feature of the invention, the chuck body is provided with respective axially displaceable pins which directly or indirectly apply a radial force to the respective jaw, these pins being directly or indirectly engageable by the aforementioned levers.

More specifically, each lever can be of the single-arm type and can be formed with a pivot stud which is received in a slot formed in the aforementioned flange and lying tangentially with respect to the chuck body. The flange can also be formed, along its face confronting the chuck body, with a respective recess opening into the aforementioned slot and accommodating the lever.

At the opposite end of the lever, the counterweight can be provided with an arc-segmental configuration and can symmetrically extend to opposite sides of the lever while overhanging the rear of the flange in the rest position of the lever.

Between the ends of the lever, the latter is formed with a lever portion constituted as an arcuate nose which can bear directly against the rear end face of the respective pin.

Each of these pins can be provided with a head forming this end face and acted upon by a restoring spring which is received in a bore of the chuck body in which the pin is axially shiftable. The restoring spring simultaneously serves to withdraw the pin from engagement with the respective jaw when the chuck body is at standstill, thereby enabling radial withdrawal of the jaw, the spring also serving to bias the lever and centrifugal weight into the rest positions during standstill.

When the pin engages the jaw directly, it also functions as a safety device preventing outward displacement of the jaw upon failure of the actuating means, for example, the pin having an inclined or wedging surface which cooperates with a complementary surface on the respective jaw to translate the axial displacement of the pin into a radial force upon the jaw.

Most advantageously, the jaws are displaced radially by wedging members which themselves are axially displaceable in the chuck body and can be engaged by a common actuating member which is displaced by the power source, e.g. a piston. The member itself may be the piston as described in the aforementioned copending application.

The wedging members may be provided with surfaces inclined to the axis of rotation of the chuck body and cooperating with similarly inclined surfaces in respective sockets of the jaws so that, upon axial displacement of each wedge member, the chuck jaw is radially displaced in the respective guide on the chuck body.

BRIEF DESCRIPTION OF THE DRAWING

The above and other objects, features and advantages of the present invention will become more readily apparent from the following description, reference being made to the accompanying drawing, in which.

SPECIFIC DESCRIPTION

Figure 2:
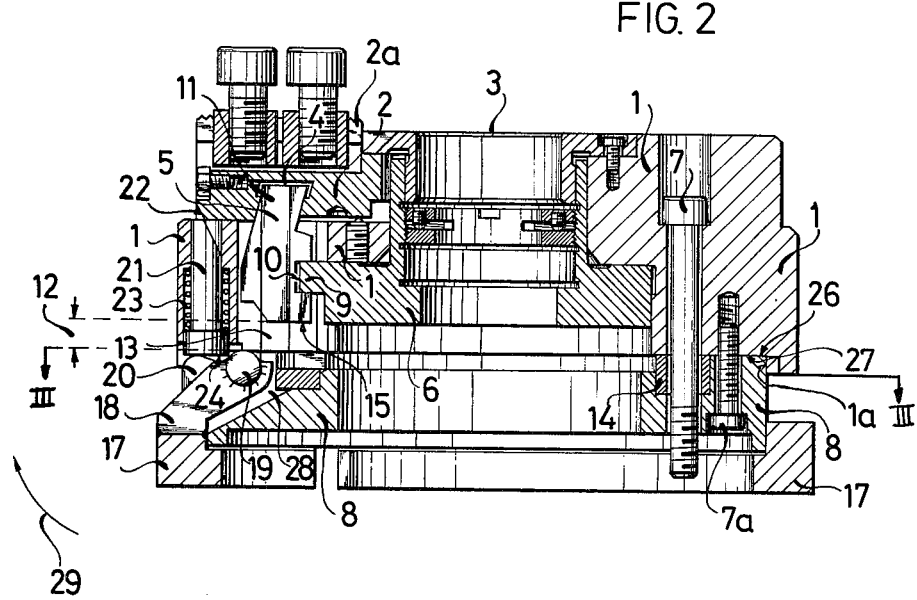
FIG. 2 is a cross-sectional view taken along the line II—II of FIG. 1.
Figure 1:
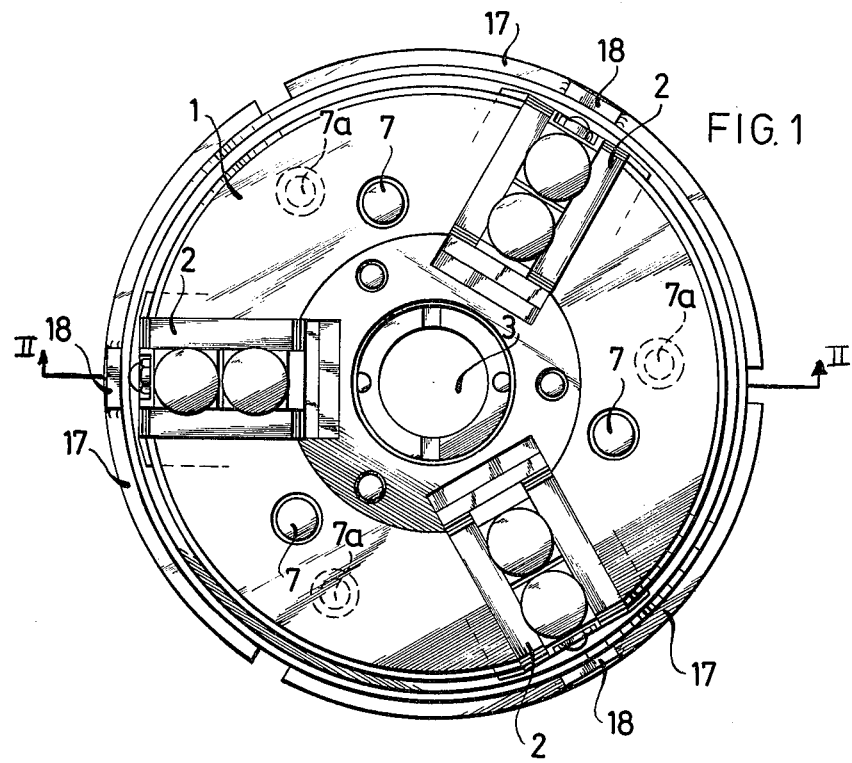
FIG. 1 is a front-end view of a chuck according to the present invention.

In the drawing I have shown a power-operated wedge-actuated chuck with a plurality of (three) radially guided jaws 2 mounted upon the circular chuck body 1. The jaws 2 can be provided, as described in the aforementioned application, with workpiece-engaging members 2a. The jaws 2 are displaced by wedge members 5 which are received in the wedge sockets 4 inclined to the chuck axis 3, the wedge members 5 being in turn displaced by an actuating member 6 which, in the embodiment illustrated, is a tubular drive sleeve for the hollow chuck. It will be understood that this sleeve can be replaced by a drive piston when a central passage is not necessary in the chuck.

The drive sleeve 6 is axially shiftable through the distance 12 for displacing the wedges 5 and hence the jaws 2, the displacement of the member 6 being effected by a tractive tube or tractive rod not shown which is connected to member 6. The rod can pass through the hollow spindle of the head stock of the machine to which the body 1 is attached by an annular flange 8 with chuck-fastening screws 7. The flange 8 is itself affixed to chuck body 1 with screws 7a and is centered on the back of the chuck body 1 in a bore 1a. The tractive tube or the tractive rod can be actuated by a tractive cylinder which is also not shown in the drawing. These tractive elements, however, are well known in the art and do not form part of the present invention.

The wedge members 5 are axially guided in the chuck body 1 in lateral guide ledges or ribs 13 and have transverse grooves 10 which receive a flanged overhang 9 of the actuating member 6. Thus members 9 and 10 are mating formations for coupling each wedge 5 with the actuating member 6 for axial displacement by this member, thereby shifting the chuck jaws inwardly upon an upward displacement of member 6 (FIG. 2) and outwardly for a downward displacement of the member 6.

To this end, each of the wedge members 5 has a pair of parallel wedging surfaces forming a head 11 which engage the wedge socket 4 in the back of each of the jaws 2. Hence the axial displacement of each wedge member 5 through the maximum stroke 12 is translated into a corresponding radial displacement of the jaws 2 inwardly or outwardly.

The wedge members 5, however, remain over the entire axial stroke 12 in engagement with the socket 4 of the respective jaw 2.

A securing ring 14 is disposed coaxially with the body 1 and the flange 8 relative to the chuck axis 3, between the chuck body 1 and this flange. The ring 14 is rotatable between two angularly offset limiting positions. In one of these positions, the wedge members 5 are locked into the respective sockets 4 since their end positions are limited by axial engagement with the ring 14 in their movement toward the flange 8. In this position, therefore, the ring 14 forms a stop for the rear end face 15 of each wedge member 5 and prevents the full withdrawal of the wedge member 5 from the respective socket 4.

Figure 3:
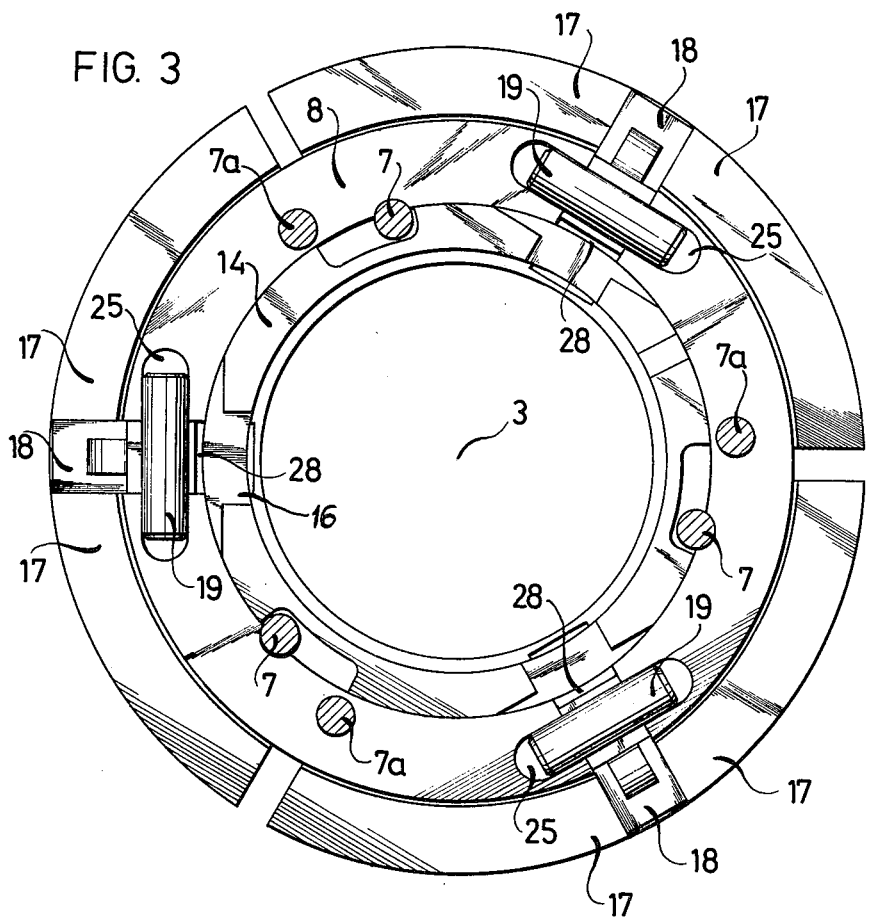
FIG. 3 is a section taken along the line III—III of FIG. 2.

The securing ring 14 is also provided with a recess 16 (FIG. 3) for each wedge member 5 which, in the other limiting position of the ring 14, is aligned with the wedge member 5 to permit the full axial withdrawal thereof past the front face of the ring 14, thereby permitting the wedge member 5 to be withdrawn from the respective socket 4.

To apply a counterforce to the jaws 2 effective in the direction opposite the centrifugal force which tends to urge them out of engagement with the workpiece, I provide respective radially displaceable centrifugal weights acting upon the jaws 2 via respective levers 18, each of which carries one of the weights 17 at one end. These levers 18 are swingable about axes defined by respective shafts or studs 19 lying tangentially with respect to the axis of rotation 3 of the chuck body 1. The pivots 19 are swingably mounted in the flange 14 disposed coaxially on the back of the chuck body 1.

Each lever 18 is provided with a lever portion 20 which, upon outward displacement of the respective weight 17, develops an axial movement component which is applied to a respective pin 21 axially shiftable in the chuck body 1 and bearing via a wedge surface 22 upon the jaw 2. The wedge surface thus transforms the axial displacement of the pin 21 into a radial force upon the jaw 2, counteracting the centrifugal force thereon which is effective radially in the outward direction.

Springs 23 bearing against the heads of the respective pins 21 bias these pins 21 in the opposite direction, i.e. against the force developed by the lever 18, thereby swinging the same about the pivots 19 into their inactive positions when the chuck is no longer rotating.

The pins 21 also function as stops limiting the outward displacement of the jaws 2 and thus have a safety function, namely, that of retaining the jaws in their guides within the chuck body 1 in the event, for example, of a rupture of the wedge 5.

When the chuck body 1 rotates at operational speeds, the weights 17 are swung outwardly, thereby camming the pins 21 acially to apply a force to each chuck jaw 2 which compensates the centrifugal force thereon. When the force is reduced, e.g. as a result of lowered speed of the chuck body, the pin 21 recedes in its axial bore in the chuck body until, at standstill, the end of the pin 21 is recessed below the respective jaw 2 and clears the latter to enable full withdrawal of the jaw upon removal of the respective wedge member 5 therefrom.

Hence the springs 23 must have a strength sufficient to swing the weights 17 into their rest positions as shown in FIG. 2, to maintain a constant contact between the lever portion 20 and the head of the pin 21, and enable the pin 21 to clear the jaw 2 upon standstill of the chuck body.

In the embodiment illustrated, each lever 18 is substantially a single-arm lever having a fulcrum, namely the pivot 19, at one end thereof, and the centrifugal weight 17 at the other end thereof, the lever portion 20 being constituted as a finger disposed between these two ends. The lever portion 20 has an arcuate form and thus constitutes a camming nose which can ride along the end face 24 of the respective pin 21.

Each lever 18 is also fixed to its pivot 19, the pivot 19 of each lever 18 being received in a tangential journal slit 25 formed in the flange 8. The journal slits 25 in the face 26 of the flange 8 are open in the direction of the rear face 27 of the chuck body 1.

The pivots 19 are, moreover, held in their journal slits 25 by abutment with the rear face 27 of the body 1.

The levers 18 extend through radial recesses 28 in the flange 8 outwardly from the slots 25. At the other ends of the levers 18, the centrifugal weights 17 are so connected that the center of gravity of each centrifugal weight 17 lies rearwardly of the pivot axis of the lever as seen in the axial direction so that the centrifugal force effective at the center of gravity is transformed into a torque on the lever 18 as represented by the arrow 29 (clockwise in FIG. 2) about the pivot axis.

The centrifugal weights 17 themselves overhang the flange 8 at the rear face thereof and can be symmetrically extended to opposite sides of the lever 18 in the form of circular arc segments around the periphery of this flange so that each weight can be of large mass.

I claim:

1. In a chuck having a chuck body rotatable about an axis, a plurality of chuck jaws radially displaceable on said body toward and away from said axis, and actuating means for radially displacing said jaws on said body, the improvement which comprises:
   a flange fixed coaxially to said body along a rear face thereof;
   a plurality of levers pivotally mounted on said flange and having weighted outer ends centrifugally displaceable upon rotation of said body;
   respective axially displaceable pins mounted in said body and engageable with said jaws for applying inwardly directed forces thereto; and
   a lever portion of each of said levers engageable with the respective pins for displacing same upon centrifugal displacement of said levers to apply to each of said jaws a force counteracting the centrifugal force thereon.

2. The improvement defined in claim 1 wherein each of said pins engages directly a wedging surface of a respective one of said jaws.

3. The improvement defined in claim 1 wherein each of said pins forms a stop limiting outward displacement of the respective jaw upon rotation of said body but is positioned to clear the respective jaw upon standstill of said body to enable withdrawal of the respective jaw from said body.

4. The improvement defined in claim 1, further comprising a restoring spring surrounding each of said pins and acting thereon in opposition to the respective lever.

5. The improvement defined in claim 1 wherein each of said levers is substantially a single-arm lever pivoted at one end on said flange and formed at the opposite end with a respective centrifugal weight, said lever portion of each lever being disposed between said ends and camminly engaging an end face of the respective pin.

6. The improvement defined in claim 5 wherein each of said levers is fixed to a respective pivot stud lying tangentially with respect to said axis, said flange being formed with respective slots swingably receiving the respective pivot studs and radial recesses through which the respective levers extend, each of said recesses communicating with the respective one of said slots, said pivot studs being held in the respective slots against a rear face of said body.

7. The improvement defined in claim 5 wherein each of said weights extends symmetrically on opposite sides of the respective lever and has the configuration of a circular arc segment.

8. The improvement defined in claim 7 wherein each of said segments overhangs the rear face of said flange in a rest position of the respective lever.

9. The improvement defined in claim 8 wherein said chuck is a power-actuated chuck formed with respective wedges engageable with said jaws for displacing same, said pins being provided with respective restoring springs acting on said pins in a direction opposite that at which said lever portions act thereon, said pins each being formed with an inclined surface cooperating directly with an inclined surface of a respective jaw to translate axial displacement of a respective pin into a radial force upon the respective jaw.

* * * * *